July 28, 1931.  F. G. THWAITS  1,816,028
RUNNING BOARD AND HOSE CARRIER
Filed Oct. 24, 1929   2 Sheets-Sheet 1
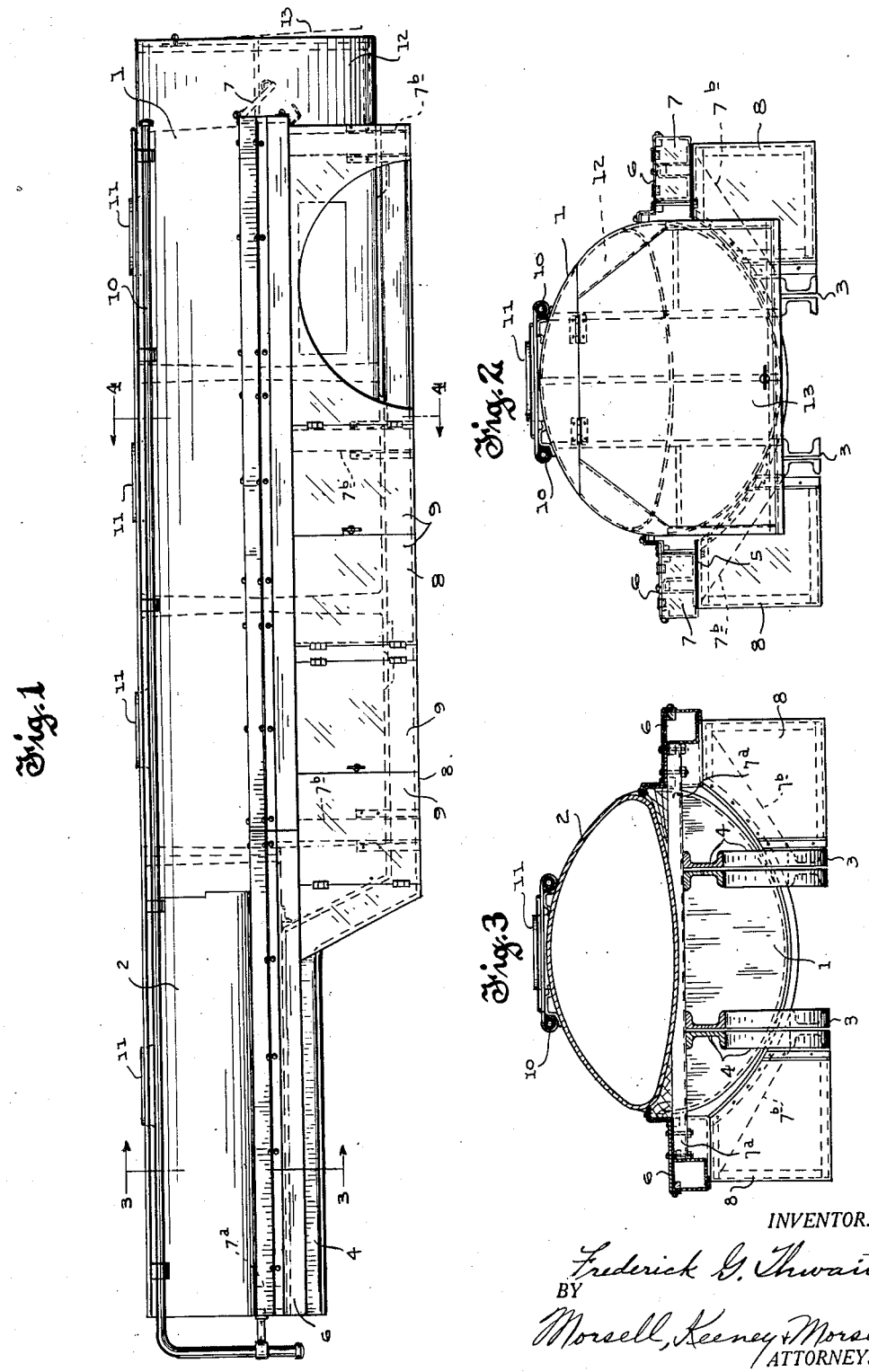
INVENTOR.
Frederick G. Thwaits
BY
Morsell, Keeney & Morsell
ATTORNEYS.

July 28, 1931. F. G. THWAITS 1,816,028
RUNNING BOARD AND HOSE CARRIER
Filed Oct. 24, 1929 2 Sheets-Sheet 2
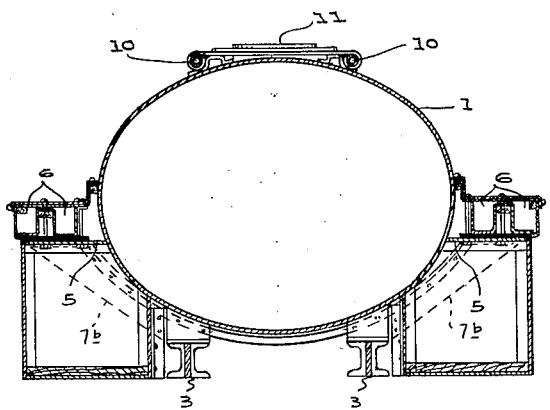
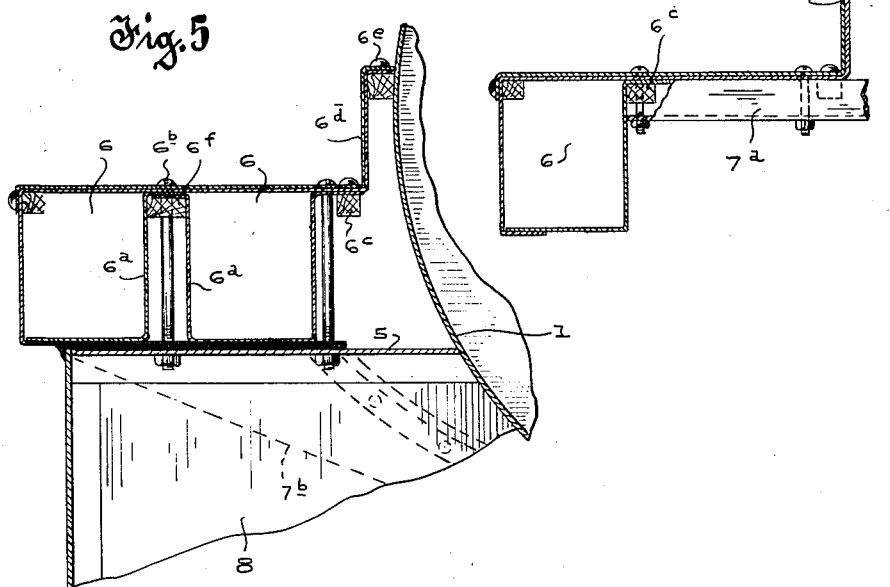
INVENTOR.
Frederick G. Thwaits
BY
Morsell, Keeney & Morsell
ATTORNEYS.

Patented July 28, 1931

REISSUED 1,816,028

UNITED STATES PATENT OFFICE

FREDERICK G. THWAITS, OF WAUWATOSA, WISCONSIN, ASSIGNOR TO THE HEIL CO., OF MILWAUKEE, WISCONSIN, A CORPORATION OF WISCONSIN

RUNNING BOARD AND HOSE CARRIER

Application filed October 24, 1929. Serial No. 402,261.

This invention has relation to that class of motor tank trucks adapted to transport liquids, such as milk in bulk and oil and with respect to which it is important to provide means for housing the lengths of hose used for discharging the liquid from the tank and also for tools, utensils, etc.; and the object of this invention is to provide a simply-constructed truck which will be strong and durable and which will provide the necessary housings for hose, etc., as more fully hereinafter set forth.

In the drawings annexed:

Fig. 1 is a side view of so much of a truck as it is necessary for me to illustrate in my invention;

Fig. 2 is a view of the rear end of the truck structure, shown in Fig. 1;

Fig. 3 is a vertical section on the line 3—3 of Fig. 1;

Fig. 4 is a vertical section on the line 4—4 of Fig. 1;

Figs. 5 and 6 are cross-sectional views showing details of the construction hereinafter more particularly described.

Referring to the drawings by referencenumerals, 1 designates the rear portion of the tank and 2, the forward portion thereof, this forward portion being of less height than the rear portion, to thus permit the steeringwheels of the truck to work beneath this narrow forward portion of the tank. The tank is mounted upon channel truck-beams 3 which extend the length of the tank and are angled up as indicated by the numeral 4 at the forward end of the tank to support the shallower part of the tank.

At each side of the tank, upon the topplate 5 of a sheet-metal compartment 8, is mounted a sheet-metal casing divided centrally by a double partition $6^a$ to form two longitudinal hose-compartments 6, this hosecasing being bolted down to the top of the plate 5 by means of a vertical bolt $6^b$. The top-plate of these hose-compartments is extended inwardly toward the tank and bolted to a longitudinal beam $6^c$, and thence the topplate is bent upwardly to form a foot-guard $6^d$, the upper edge of the foot-guard being turned inwardly to meet the adjacent wall of the tank and being fastened to the longitudinal beam by means of a bolt $6^e$. Another longitudinal beam $6^f$ is fastened between the walls of the double partition $6^a$ by the aforesaid bolts $6^b$. Access to the hosecompartments 6 is had at the rear end of the truck by means of a door 7. These compartments are adapted to contain comparatively long lengths of hose and house them in convenient position for use from time to time as they are needed in discharging the milk or other liquid from the tank. At the forward, shallower part of the tank, the hosecompartment is reduced to a single compartment, as shown in Fig. 3, and the inwardlyextending foot-guard at that point is bolted down to cross-beams $7^a$.

The plate 5, above described, forms the top-plate of a series of sheet-metal compartments 8 arranged along each side of the tank and extending desirably the length of the tank between the wheels of the truck. These compartments form part of the structure of the hose-compartments, and are suspended therefrom, and the entire structure is supported on the cross beams $7^a$ and upon curved brackets $7^b$ which extend down to and from one to the other of the longitudinally extending truck beams 3, so as to afford a firm and substantial support for the running-board hose-compartments. Each compartment is provided with a door 9. For the convenience of the attendants who make use of the running-board, I provide hand-rails 10 along the sides of the tank, and for filling the various compartments of the tanks, these compartments being formed by transverse partitions, as usual, I provide each compartment with a filling-opening 11. The rear end of the tank portion 1 forms a compartment 12 especially adapted for housing the utensils usually employed in connection with trucks of this character, and this compartment is closed by a door 13.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What is claimed as new is:

1. A vehicle transportable housing comprising, an elongated tank, an elongated compartment secured to and forming a running board extending along each of the opposite sides of said tank, said elongated compartments being accessible only from the rear of said tank, and other compartments suspended from said elongated compartments and extending downwardly into the space between the front and rear wheels of the vehicle, said other compartments being accessible only from the sides of said tank.

2. A vehicle transportable housing comprising, an elongated tank having elliptical cross-section with its major diameter horizontal, an elongated compartment secured to the medial portion of each of the opposite sides of said tank and extending therealong to form running boards, said elongated compartments being accessible only from the rear of said tank, and other compartments suspended from said elongated compartments and extending under said tank and downwardly into the space between the front and rear wheels of the vehicle, said other compartments being accessible only from the sides of said tank.

In testimony whereof, I affix my signature.

FREDERICK G. THWAITS.